United States Patent
McKenna et al.

(10) Patent No.: US 9,374,606 B2
(45) Date of Patent: Jun. 21, 2016

(54) SYNCHRONIZATION OF SUPPLEMENTAL DIGITAL CONTENT

(71) Applicant: NBCUniversal Media, LLC, New York, NY (US)

(72) Inventors: Matthew McKenna, Rahway, NJ (US); Myra Einstein, New York, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 0 days.

(21) Appl. No.: 14/046,707

(22) Filed: Oct. 4, 2013

(65) Prior Publication Data

US 2015/0100999 A1    Apr. 9, 2015

(51) Int. Cl.
*H04N 21/43* (2011.01)
*H04N 21/242* (2011.01)
*H04N 21/462* (2011.01)
*H04N 21/4722* (2011.01)
*H04N 21/84* (2011.01)
*H04N 21/8545* (2011.01)
*H04N 21/8547* (2011.01)

(52) U.S. Cl.
CPC ......... *H04N 21/242* (2013.01); *H04N 21/4307* (2013.01); *H04N 21/4622* (2013.01); *H04N 21/4722* (2013.01); *H04N 21/84* (2013.01); *H04N 21/8545* (2013.01); *H04N 21/8547* (2013.01)

(58) Field of Classification Search
CPC .......... H04N 21/4302; H04N 21/4586; H04N 21/812; H04N 21/8126; H04N 21/242; H04N 21/8547; H04N 21/4307; H04N 21/4622; H04N 21/4722; H04N 21/84; H04N 21/8545

USPC ............................................ 725/32, 143–146
See application file for complete search history.

(56) References Cited

U.S. PATENT DOCUMENTS

| | | | | |
|---|---|---|---|---|
| 5,889,950 | A * | 3/1999 | Kuzma | H04N 21/4622 725/117 |
| 2001/0001160 | A1* | 5/2001 | Shoff | H04N 21/4622 725/51 |
| 2004/0196410 | A1* | 10/2004 | Johnson | 348/723 |
| 2004/0237120 | A1* | 11/2004 | Lewin et al. | 725/135 |
| 2007/0250901 | A1* | 10/2007 | McIntire et al. | 725/146 |
| 2008/0083003 | A1* | 4/2008 | Biniak | H04N 21/4722 725/110 |
| 2008/0263619 | A1* | 10/2008 | Auwens | H04N 21/235 725/134 |
| 2010/0131975 | A1* | 5/2010 | Landow et al. | 725/34 |
| 2010/0169910 | A1* | 7/2010 | Collins et al. | 725/14 |
| 2013/0024897 | A1* | 1/2013 | Eyer | 725/50 |
| 2013/0138781 | A1* | 5/2013 | Landow | H04L 67/02 709/219 |
| 2014/0032565 | A1* | 1/2014 | Parker | 707/741 |
| 2014/0195358 | A1* | 7/2014 | Beining | H04N 21/812 705/14.73 |
| 2014/0337868 | A1* | 11/2014 | Garza | H04N 21/44218 725/12 |

* cited by examiner

*Primary Examiner* — Pankaj Kumar
*Assistant Examiner* — Alexander Boyd
(74) *Attorney, Agent, or Firm* — Fletcher Yoder, P.C.

(57) ABSTRACT

Supplemental digital content is provided to be played in synchronization with primary digital content on a media device, such as a television, handheld device, smart phone, computer, and so forth. The supplemental digital content is timed to a long-form version of the primary content and is then synchronized based upon a linearized content (e.g., broadcast) schedule of the long-form content with populated pods.

22 Claims, 8 Drawing Sheets

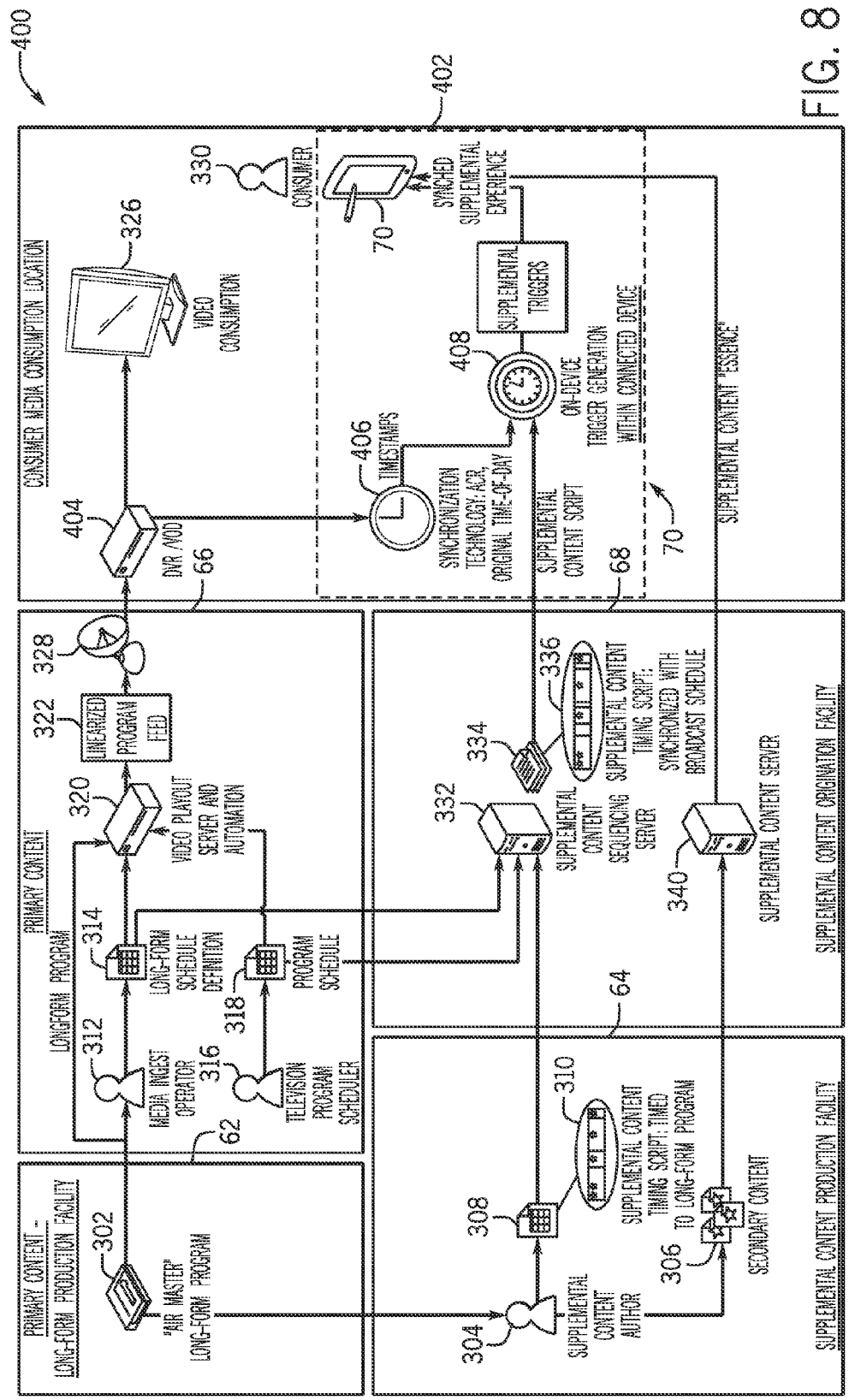

SYNCHRONIZATION OF SUPPLEMENTAL DIGITAL CONTENT

CROSS-REFERENCE TO RELATED APPLICATIONS

Background

The present invention relates generally to the field of digital content for the delivery of video, audio and multi-media content, and more particularly to innovations for the delivery of supplemental content that may be of interest to a receiver of a primary content.

The field of digital-content delivery has undergone substantial changes in recent years. Traditional media included, for example, broadcast television, cinema, physical supports for audio recording and playback, and so forth. These industries have been revolutionized by the ability to store, transmit, deliver and play back content of interest to wider ranges of audiences by digital means. Current technologies include, for example, traditional broadcast technologies, satellite transmission, cable delivery systems, cellular transmission systems, Internet delivery systems, as well as a range of physical memory supports for receiving, storing and playing back content. An area of increasing interest in the field relates to the ability to provide additional or supplemental information and content based upon a primary content that is transmitted, stored or played back on a device, such as a television, hand-held device, computer, smart phone, and so forth.

One challenge in the delivery of such supplemental content is ensuring that the supplemental content is related in some meaningful way to the primary content being enjoyed by the users. Traditional techniques for associating supplemental content with primary content have done so in a coarse fashion. For example, systems have been developed in which users may, at their own initiation, request additional content, such as while viewing a scheduled television broadcast. The additional content may be requested, for example, by calling a telephone number or visiting a website that appears on the television screen. Other techniques have involved, for example, determining a channel that is currently tuned on a receiver, such as the television, and providing content based upon such knowledge and knowledge of scheduled programming on the channel. Still further, techniques have been developed for delivering content such as advertising, offers and promotions, to audiences that may be interested based upon service subscription, geographical locations, demographic markets, and so forth.

However, the traditional techniques do not offer a flexible system that can adapt presentation of supplemental content based on a network play out schedule of the primary content. Long-form content may include segment start and/or end markers where additional content may be inserted. Based upon a particular goals or interests of the broadcaster, the size and/or amount of inserted content may change each time the primary content is aired. Accordingly, the timings of the primary content may change each time a piece of primary content is aired. Traditional approaches have not adapted to timing changes based upon the addition of segments of content to the long-form version of the content.

There is a need, therefore, for improved systems that can accommodate the great variety of play out schedules of primary content, and provide supplemental content that may be of interest to users based upon a particular play out schedule of the primary content. Further, there is a particular need for a system that can perform these functions independent of whether the primary content is presented to the consumer in real-time or in a time-shifted approach (e.g., played back at a later date based upon a recording of the primary content).

BRIEF DESCRIPTION

The present invention provides novel techniques for primary and supplemental content delivery designed to respond to such needs. For example, the technique may be used with many different electronic playback devices, such as televisions, television systems, multi-media systems, audio playback devices, computers, hand-held devices, and so forth. The supplemental content playback techniques offered by the invention also allow for complete or virtually complete independence from the source and time of the provision of the primary content. Various types of supplemental content may be provided, such as content that may compliment or work closely with the primary content. For example, the supplemental content may include audio content intended to be played back with video content, interactive content to be played back with video content, textual information that may of interest related to the primary content, offers and promotions for products and services that may be related to the primary content, surveys, polls, or any other information (e.g., text, video, audio, and/or computer-readable objects) that may of interest to an audience based upon knowledge of the primary content then being played back.

The primary content and supplemental content may be consumed and provided by a single consumption device and/or by separate consumption devices. For example, the primary content and any synchronized supplemental content may be provided on a common device, such as a television or computer. In some embodiments, the primary content and the supplemental content may be provided to separate consumption devices. For example, when the primary content may be provided to a television or computer, the supplemental content may be provided to a separate device, such as a second television or computer or a tablet computing device or other media playback device.

The supplemental content may be associated with particular portions of a long-form version of the primary content. The associated supplemental content may then be synchronized with a particular play out schedule for a particular airing of the primary content. Accordingly, the technique described herein may enable supplemental content to be granularly synchronized with primary content by synchronizing playback of the supplemental content at particular timeframes of playback of the primary content.

DRAWINGS

These and other features, aspects, and advantages of the present invention will become better understood when the following detailed description is read with reference to the accompanying drawings in which like characters represent like parts throughout the drawings, wherein:

FIG. 8 is a diagrammatical representation of a system for performing the described techniques during time-shifted play out of the primary content, in accordance with an embodiment;

DETAILED DESCRIPTION

Figure 1:
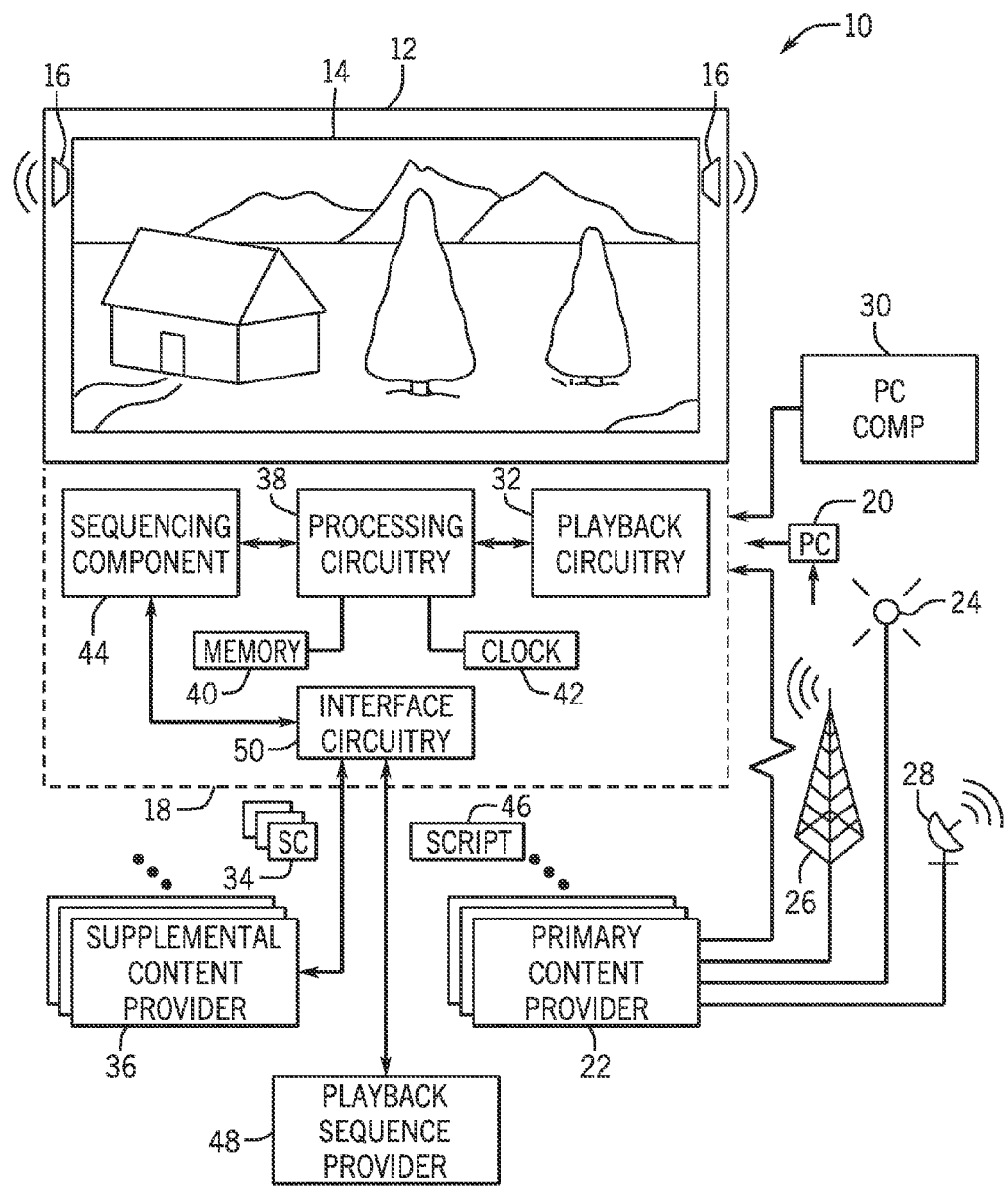
FIG. 1 is a diagrammatical representation of a content delivery system incorporating aspects of the present techniques, in accordance with an embodiment.

Turning now to the drawings, FIG. 1 represents a content delivery system 10 enabled to provide primary content and supplemental content that may be of interest to an audience. The supplemental content may be triggered at various presentation timeframes within the primary content, as determined based upon a particular play out schedule of a long-form primary content program and pod content inserted into the long-form primary content program. As used herein, long-form content refers to content with segment definitions. For example, in some embodiments, these segment definitions may be defined by blackout periods of a particular duration, which may be referred to as "black slugs." Alternatively, these segment definitions may be defined by alternative means, such as a digital content slate (e.g., frames of video containing metadata regarding the content/content segment) or some other sort of discontinuous break in the edit sequence to denote segmentation.

The segments may denote portions of the long-form content where additional content (e.g., commercial content, promotional content, informative content, etc.) may be incorporated. As used herein, a pod may refer to a placeholder for content (i.e., pod content) added to the long-form in between the long-form content segments (e.g., at positions denoted by the black slugs). Further, the term linearized program feed refers to the long-form content with populated pods (e.g., the primary content with populated commercial breaks).

The system includes a media device 12 that maybe adapted for playing video, audio, or multi-media content. In practice, the media device 12 may be a television set, a collection of components including a television set, a computer with monitor, an audio-only playback system, a hand-held device, a smart phone or any other media device to which digital content is delivered and used by a user or a target audience. In the illustrated embodiment, the media device 12 includes a monitor 14 for providing still or moving pictures based upon the received content, as well as speakers 16 for providing audio output.

The illustrated media device 12 also includes a data processing system represented generally by reference numeral 18. The processing system may include multiple components as illustrated and described herein, or in certain embodiments such components may be provided in separate devices that are used in conjunction with the media device, although all these are generally taken into account in the use of the term media device in the present context. The data processing system 18 is designed to receive primary content 20 from one or more primary content providers 22. Again, this primary content may include video, audio, multi-media, text, or any other desired digital content. The primary content providers, in turn, may include television broadcast companies, cable providers, satellite programming providers, Internet-based content providers, radio stations, or any other providers of digital content. Moreover, in the illustrated embodiment any one of a range of technologies may be used for delivering the primary content to the media device. In the illustrated embodiment these include cable links 24, such as for cable television, Internet communications, and so forth, broadcast technologies as indicated by reference numeral 26, and satellite transmission technology as indicated by reference numeral 28. Other technologies may, of course, be employed, including cellular technologies, various wireless technologies, and so forth. It should also be noted, that the media device may receive the primary content from a wide range of other components, as indicated by reference numeral 30. These components may include stored content sources, such as disk readers, solid state memory, cloud computing services, third-party storage and/or playback systems, and so forth. In general, all of these sources may be capable of providing the primary content that is played by the media device at a known or unknown time. That is, some of the content may be scheduled, such as television programming, while other content may be viewed at a time that is shifted from a broadcast time slot, or even that corresponds to no particular schedule at all, such as in the case of delayed playback, playback of stored content, and so forth.

The data processing system 18, as described more fully below, is designed to synchronize supplemental content with primary content 20 based upon a play out schedule of the primary content 20. Thus, not only may the system 10 access and play the primary content 20 itself, but additional or supplemental content that may be of interest to the receiving audience may be provided at certain timeframes of the primary content 20. Accordingly, the supplemental content may be provided at different times during the long-form content, based upon the particular pod configuration for the long-form content (e.g., the number of pods and the pod sizes).

Thus, the data processing system 18 will comprise receivers/playback circuitry 32 that receive the primary content 20 from one of the content sources and play back the content in accordance with generally known reproduction and playback techniques. Supplemental content 34 is then provided based upon the primary content. Such supplemental content will originate in one or more supplemental content providers 36 which, in many practical applications may overlap with the primary content providers 22, or these may be separate entities. In certain presently contemplated embodiments, the supplemental content may be intended to directly compliment the primary content, such as in the case of music, foreign language audio, or other content which is intended directly to be played simultaneously with the primary content 20. In other cases the supplemental content may be somewhat loosely linked to the primary content, such as to provide details regarding the primary content, additional information regarding plots, characters, actors, and the like, offers for additional information that may be of interest, sports scores and statistics, stock prices, product and service offerings, just to mention a few. In other contexts, the supplemental content may simply be directed to the target audience based upon selection of the primary content type, as indicated by a geographic location of playback, a demographic drivable from the primary content or other information stored on the media device 12 or known about the audience, and so forth.

The data processing system 18 further includes processing circuitry 38 which in most cases will include some type of microprocessor, digital signal processor, or the like. The processing circuitry performs functions, many of which may be beyond the scope of the present description, including control of video, control of audio, implementation of coding and decoding schemes used by the receiver/playback circuitry, and so forth. The processing circuitry 38 may include, or separate memory circuitry may be provided as indicated by reference numeral 40. Moreover, the processing circuitry 38 may include, or a separate clock may be provided as indicated by reference numeral 42. As described more fully below, the clock may be consulted at various times during playing of the primary content and/or the supplemental content in order to synchronize these with one another to a degree desired.

As indicated at reference numeral 44 in FIG. 1, the processing circuitry further includes a sequencing component. As will be discussed in more detail below, this component includes circuitry designed to determine when supplemental/supplemental content should be played, based upon a sequencing script 46 provided by a playback sequencing provider 48. The sequencing component, whether in hardware, software, firmware or any combination of these, serves to interpret the script to determine when playback of the supplemental content should begin.

The data processing system 18 is designed to operate with external devices through interface circuitry 50. Such circuitry may be based upon any desired technology and protocols, such as Internet protocols, wireless protocols, telephony protocols, and so forth. As illustrated in FIG. 1, the interface circuitry may receive the supplemental content 34 from one or more of the supplemental content providers 36. Further, the sequencing script 46 may be received at the interface circuitry. The sequencing script 46 may be timed to a particular play out schedule associated with the currently playing primary content 20. Accordingly, the sequencing component 44, in coordination with the processing circuitry 38, may determine particular timeframes during the primary content play out where supplemental content 34 should be provided (e.g. played back and/or displayed) and/or removed (e.g., stopped and/or removed from display). Additionally, the sequencing component 44 may determine relationships between a plurality of pieces of supplemental content and/or determine which supplemental content to display based upon specifications provided in the script 46, internal rules of the sequencing component 44, and/or playback characteristics (e.g., how long the primary content has been playing at the system 10, what timeframe during the playback of the primary content the playback began, etc.), which may be determined by the processing circuitry 38 in coordination with the playback circuitry 32.

In the embodiment illustrated in FIG. 1, the supplemental content provider 36 is illustrated as separate from the primary content provider 22, and the supplemental content 34 is illustrated as being provided separately from the primary content 20. Other scenarios are possible and presently envisage as well. For example, in some embodiments, the supplemental content may be provided with the primary content, including by one or more primary content providers, and the technologies used for transmitting the primary content. In such scenarios, the supplemental content provider may be the same entity as the primary content provider or a link between the supplemental content provider and the primary content provider may be provided, such as to allow the supplemental content provider to "piggyback" the supplemental content with the primary content.

Still further, protocols and techniques for integrating the supplemental content with the primary content may include rich and varied approaches, as may the software and hardware that permit such integration. By way of example, protocols and schemes described below may be used to adapt the supplemental content to the particular media device, media device manufacturers, media device capabilities, or even positions of the media device, such as in the case of smart phones held in one position or another position. The particular configuration of the media device may be taken into account when providing or adapting supplemental content. To facilitate such adaptability, various software schemes may be used, including the use of applications executed by the processing circuitry 38 and adapted specifically for various hardware platforms and device manufacturers. Such techniques are described, for example, in U.S. Patent Application Ser. No. 61/502,256, filed on Jun. 28, 2011, entitled "Application Structure for Web-enabled Computer Electronics Device", which is here incorporated by reference.

Figure 2:
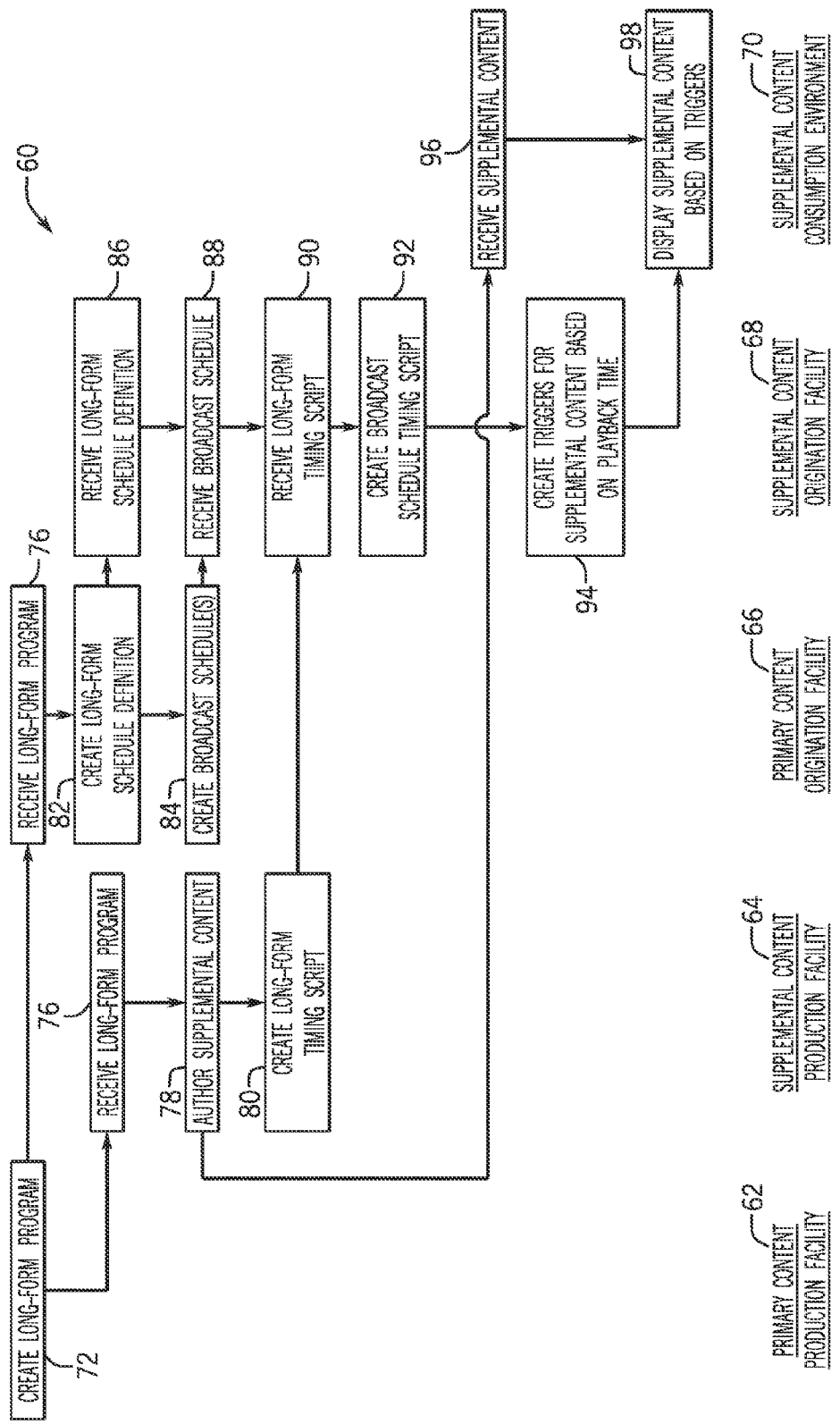
FIG. 2 is a flowchart of a process for synchronizing supplemental content with a particular play out schedule of primary content, in accordance with an embodiment.

FIG. 2 is a flowchart 60 of a process for synchronizing supplemental content with a particular play out schedule of primary content, in accordance with an embodiment. The flowchart provides a series of columns defining actions performed by various actors/facilities of the synchronized supplement content system described herein. For example, a synchronized supplement content system may include a primary content facility 62 responsible for producing the primary content. Further, a supplemental content production facility 64 may be responsible for producing the supplemental content timed to particular timeframes of the primary content. A primary content origination facility 66 may determine content for long-form content pods and determine an actual broadcasting time for the long-form content with populated pods. A supplemental content origination facility 68 may develop a sequencing/timing script for the supplemental content based upon the broadcast schedule defined by the primary content origination facility. Finally, based upon the sequencing/timing script, the supplemental content consumption equipment 70 may provide the supplemental content at particular timeframes of the primary content. While the flowchart 60 provides an example of typical actors/facilities that may be present in the supplemental content synchronization system described herein, any number of alternative actor/facility combinations may exist. For example, as discussed above, the primary content production facility 62 and the supplemental content production facility 64 may be one and the same. Further, the primary content origination facility 66 and the supplemental content origination facility 68 may be one and the same.

As illustrated in the flowchart 60, the process begins by creation of the long-form program/content (block 72). As discussed above, the long-form program may be content that is segmented (e.g., for the insertion of pods/pod content at the segmentations). The long-form content is provided to the supplemental content production facility and the primary content origination facility, where it is received (blocks 74 and 76, respectively).

Based upon the received long-form program, the supplemental content production facility 64 may author supplemental content for playback at particular times during the long-form program (block 78). For example, a website link for particular clothing worn by a primary content actor during a particular timeframe of the primary content may be authored and timed to the particular timeframe. Accordingly, the website link may be provided when the clothing is visible in the primary content. In another example, a coding object (e.g., a snippet of computer-implemented instructions) may be associated with the particular timeframe. For instance, in the clothing example, a poll question may be provided asking a yes/no question regarding whether the content consumer likes the clothing that the actor is wearing. As mentioned above, the supplemental content could include many different items. In some embodiments, the supplemental content may include: audio, video, text, content consumer polls or prompts, playback device-readable instructions, etc. Once the supplemental content is authored, the supplemental content production facility 64 may create a long-form timing script providing triggers for starting and/or stopping provision of the supplemental content (block 80). For instance, continuing with the clothing example discussed above, the long-form timing script may provide a trigger for displaying the web link at a timeframe when the clothing appears in the primary content and/or provide a trigger for removing provision of the web link at a timeframe when the clothing no longer appears in the primary content. While the current discussion relates to start/stop triggers, other duration triggers are envisioned. For example, a trigger may define a particular duration for supplemental content provision. Upon creation of the long-form timing script, the supplemental content is timed to the long-form program without populated pods/pod content.

Upon receiving the long-form program (block 76), the primary content origination facility 66 creates a long-form schedule definition (block 82). The long-form schedule definition is computer-readable file that denotes timecodes representing the start/stop times of the long-form program segments. The long-form schedule definition may further include meta-data for a particular run of the long-form content, which may be used in the synchronization of supplemental content with the primary content. For example, in some embodiments, the long-form program may be time-tailored (e.g., configured to fit within a particular time allotment by removing particular frames from the long-form program). The meta-data may include a time-tailoring status and/or other information regarding time-tailoring of the long-form content. This information may aid in correctly synchronizing supplemental content to the long-form segments by enabling the synchronization to account for any time-tailoring that may exist with regards to a particular airing of the long-form program. Additionally, other meta-data information from the long-form schedule definition may alter synchronization and playback of supplemental content. For example, MPAA Guideline Ratings and/or TV Parental Guideline Ratings may alter particular supplemental content that is synchronized with the long-form content. For example, if the long-form content is rated "G" for general audiences, general audience supplemental content may be provided with the long-form content. However, if the long-form content is rated "R" for restricted to audiences of 18 years of age or older, supplemental content that is rated "R" or lower may be provided.

The primary content origination facility 66 then creates a broadcast schedule by: defining a particular time and day that the primary content will be aired, defining the pod lengths, and populating the pods with pod content (e.g., commercials) (block 84). As may be imagined, two airings of a particular piece of primary content may vary substantially. For example, the pod lengths may be altered to adapt to different commercial break conditions at a given time/date. Accordingly, the ability to time the supplemental content to the long-form program regardless of variation in the broadcast schedule is highly beneficial. As discussed in more detail below, such implementation enables supplemental content production facilities to author content independent of varying pod duration.

Once the broadcast schedule is complete, the supplemental content origination facility may receive the created long-form schedule definition (block 86) and the broadcast schedule (block 88). Further, the long-form timing script may be received from the supplemental content production facility (block 90). Based upon these three received components, the supplemental content origination facility may create a linearized content script that times the supplemental content to the linearized program feed (block 92). In one embodiment, the long-form schedule definition and the pod information found in the broadcast schedule are used to segment the linearized program feed, such that the long-form timing script may be applied to the segmented linearized program feed. Then, the linearized program feed start time provided in the broadcast schedule is used to determine the actual time to trigger the supplemental content.

Based upon the linearized content script, triggers are generated for providing and/or removing provision of the supplemental content (block 94). As illustrated, depending on the embodiment, these triggers may be created either by the supplemental content origination facility 68 or the supplemental content consumption environment 70. For example, in one embodiment, the supplemental content origination facility 68 may create triggers and provide the triggers to, for example, the sequencing component 44 of FIG. 1, where they are interpreted and cause the provision of the supplemental content. In an alternative embodiment, the sequencing component 44 may create the triggers based upon a received linearized content script, thus causing the provision of the supplemental content. The supplemental content consumption environment 70 receives the supplemental content (block 96) and provides the supplemental content based upon the created triggers (block 98).

Figure 3:
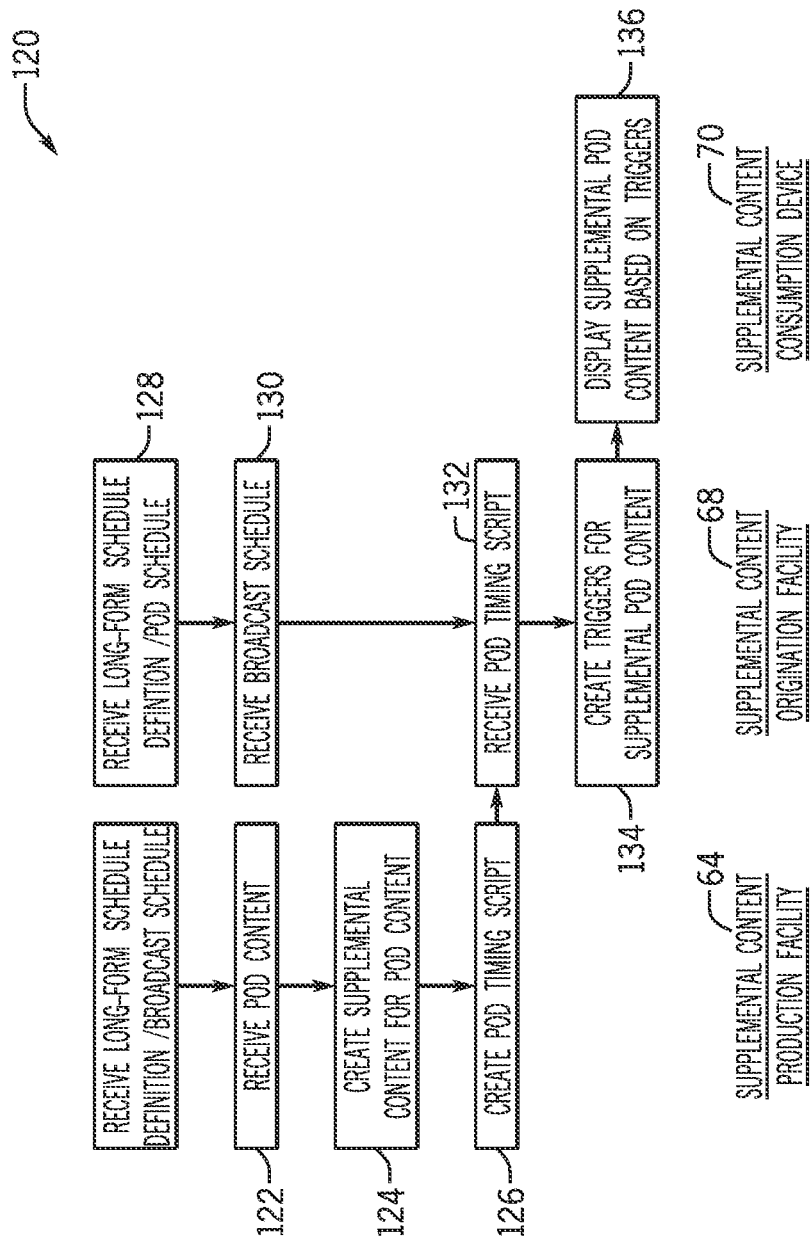
FIG. 3 is a flowchart of a process for synchronizing supplemental content with a pod of a particular play out schedule of primary content, in accordance with an embodiment.

Supplemental content may also be synchronized to pod content within a pod (e.g., commercials within a commercial break). FIG. 3 is a flowchart 120 of a process for synchronizing supplemental content with pod content of a particular play out/broadcast schedule of primary content, in accordance with an embodiment. First, pod content is received (block 122). Supplemental content is authored and timed to the pod content (block 124). A script timing the supplemental content to the pod content is created (block 126). The supplemental content origination facility receives the pod scheduling (block 128), the broadcast schedule (block 130), and the pod timing script (block 132). Triggers for the supplemental content are created based upon the pod scheduling, the broadcast schedule, and the pod timing script in a manner similar to block 94 of FIG. 2 (block 134). The supplemental content is provided based upon the triggers (block 136). For example, in some embodiments, the primary content origination facility 66 of FIG. 2 may receive the supplemental pod content and/or the supplemental pod content triggers (e.g., from the supplemental content origination facility 68) and schedule the supplemental pod content to air with the primary content. Alternatively, the supplemental content origination facility 68 may schedule and provide the supplemental pod content directly to the supplemental pod content consumption device (e.g., a tablet computing device, computer, or television).

Figure 4:
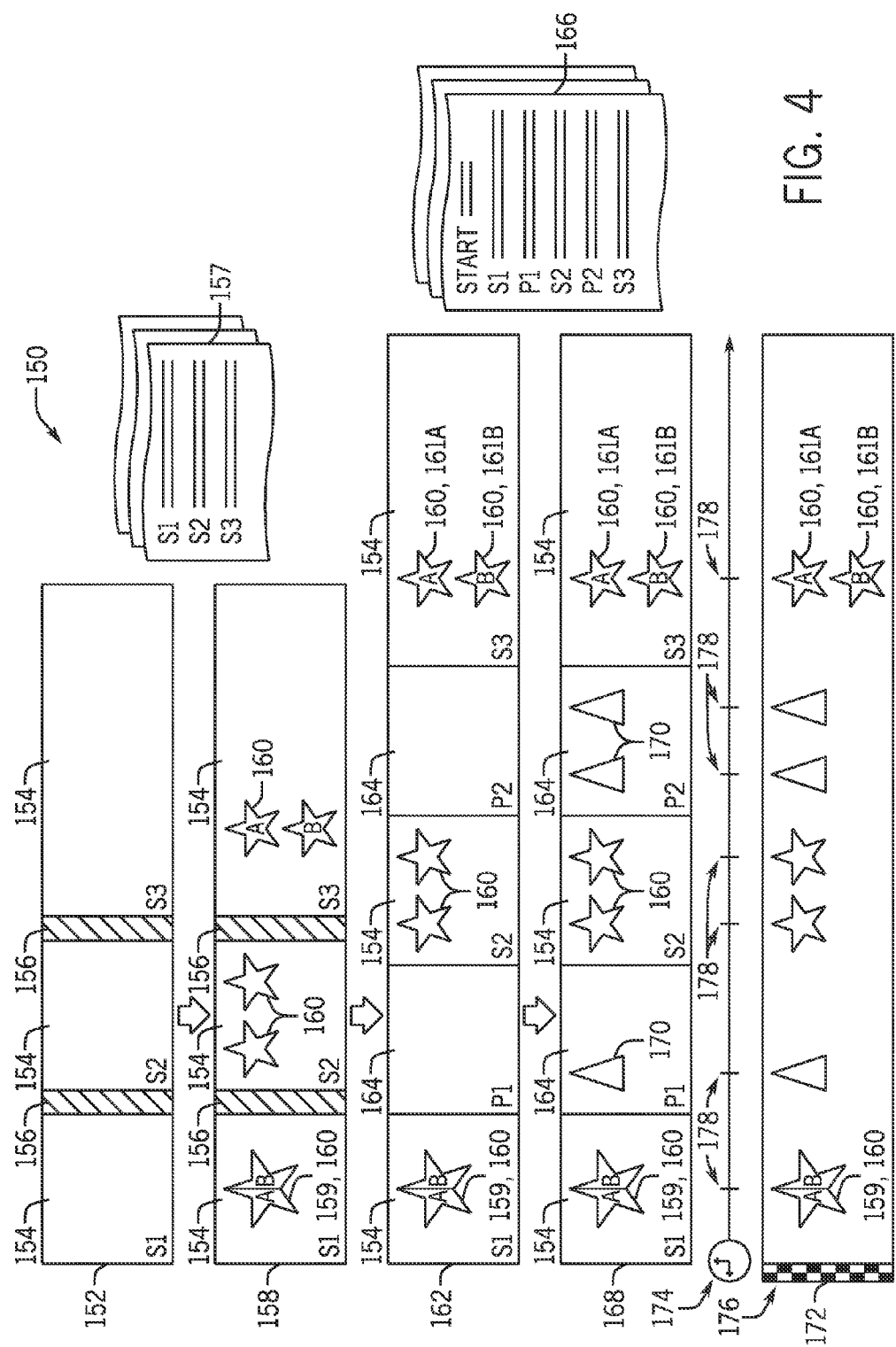
FIG. 4 is a diagrammatical representation of the creation of supplemental content triggers associated with a particular primary content play out schedule, in accordance with an embodiment.

FIG. 4 is a diagrammatical representation 150 of the creation of supplemental content triggers associated with a particular primary content play out schedule, in accordance with an embodiment. First, the long-form content 152 includes segments 154 and black slugs 156, which define locations where pods may be inserted. The long-form schedule definition(s) 157 determine the start and stop points of the segments 154. Diagram 158 illustrates supplemental content triggers 160 timed to the long-form content 152.

In some embodiments, one or more of the triggers may be branching triggers 159 that result in one or more alternative subsequent triggers. For example, in the diagram 158, a first branching trigger 159 (e.g., a user interaction with content associated with the first branching trigger 159) may result in a branch between either branched trigger 161A or 161B. In some embodiments, both triggers 161A and 161B may be triggered at approximately the same time, resulting in both triggers 161A and 161B being provided at the supplemental content consumption device. As discussed in more detail herein, the triggers 160 may be timed to the primary content using scripts (e.g., the long-form timing scripts and the linearized content scripts discussed in FIG. 2). Branching instructions (e.g., computer-readable instructions for branching between triggers 161A and/or 161B) may be provided in a single set of scripts that include all branching instructions, in individual branching scripts sets per branch (e.g., one set for the 161A branch and another for the 161B branch), or a combination thereof (e.g., when the branches diverge, individual script sets may be generated, but if/when the branches re-converge, a common script set may be used). Further, while the current example illustrates interaction with supplemental content resulting in the branched supplemental content, in some embodiments, the branching may result from interaction with the primary content or a combination of the primary and supplemental content.

Next, the diagram 162 illustrates pods 164 inserted in place of the black slugs 156. The start/stop timings of the pods 164 are incorporated with the segment timings of the long-form schedule definition 156 to create the broadcast schedule 166. In some embodiments, as illustrated in diagram 168, supplemental content triggers 170 are associated with the pod content in the pods 164. Lastly, the linearized content 172 illustrates real-world timing 174 associated with the triggers 160 and 170 based upon the start time 176 as defined in the broadcast schedule 166. Accordingly, the triggers 160 and 170 signify real world time supplemental content events 178 where supplemental content is provided and/or removed from provision.

Figure 5:
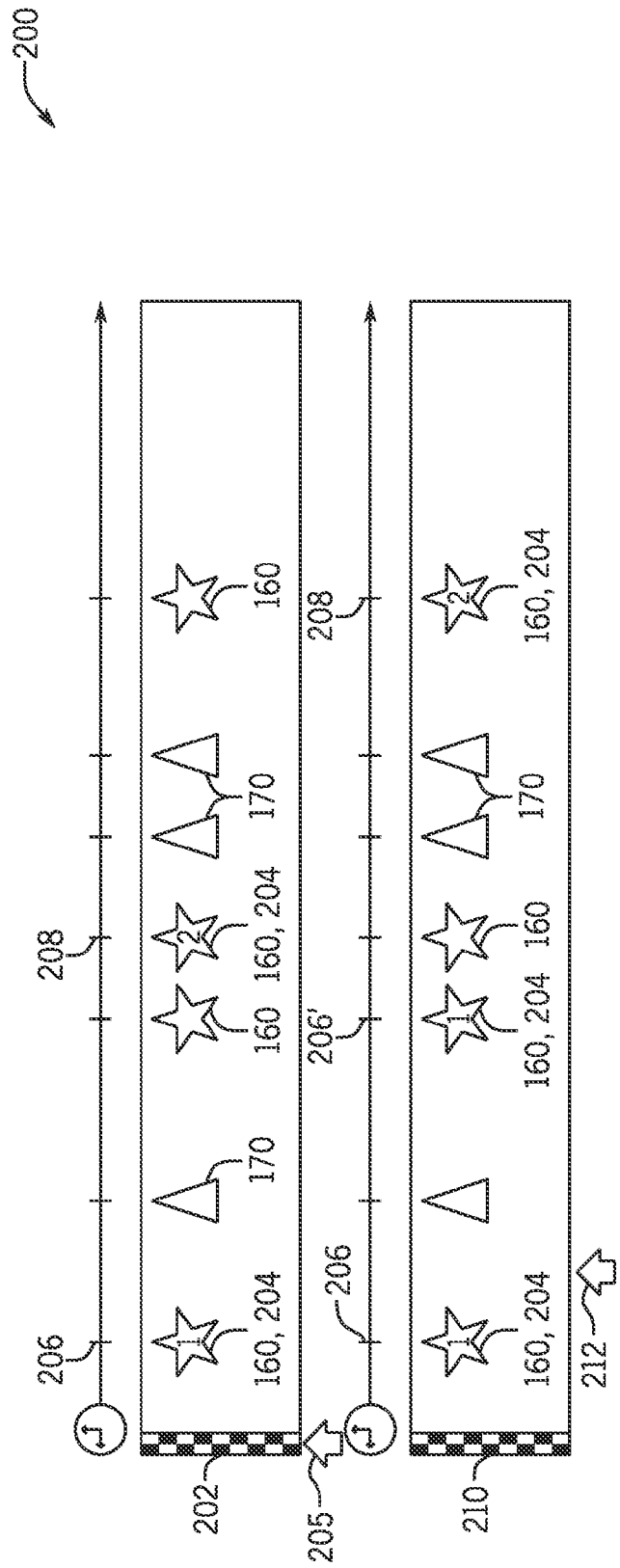
FIG. 5 is a diagrammatical representation of a variant of relational and dynamically adjusting supplemental content triggers, in accordance with an embodiment.
Figure 6:
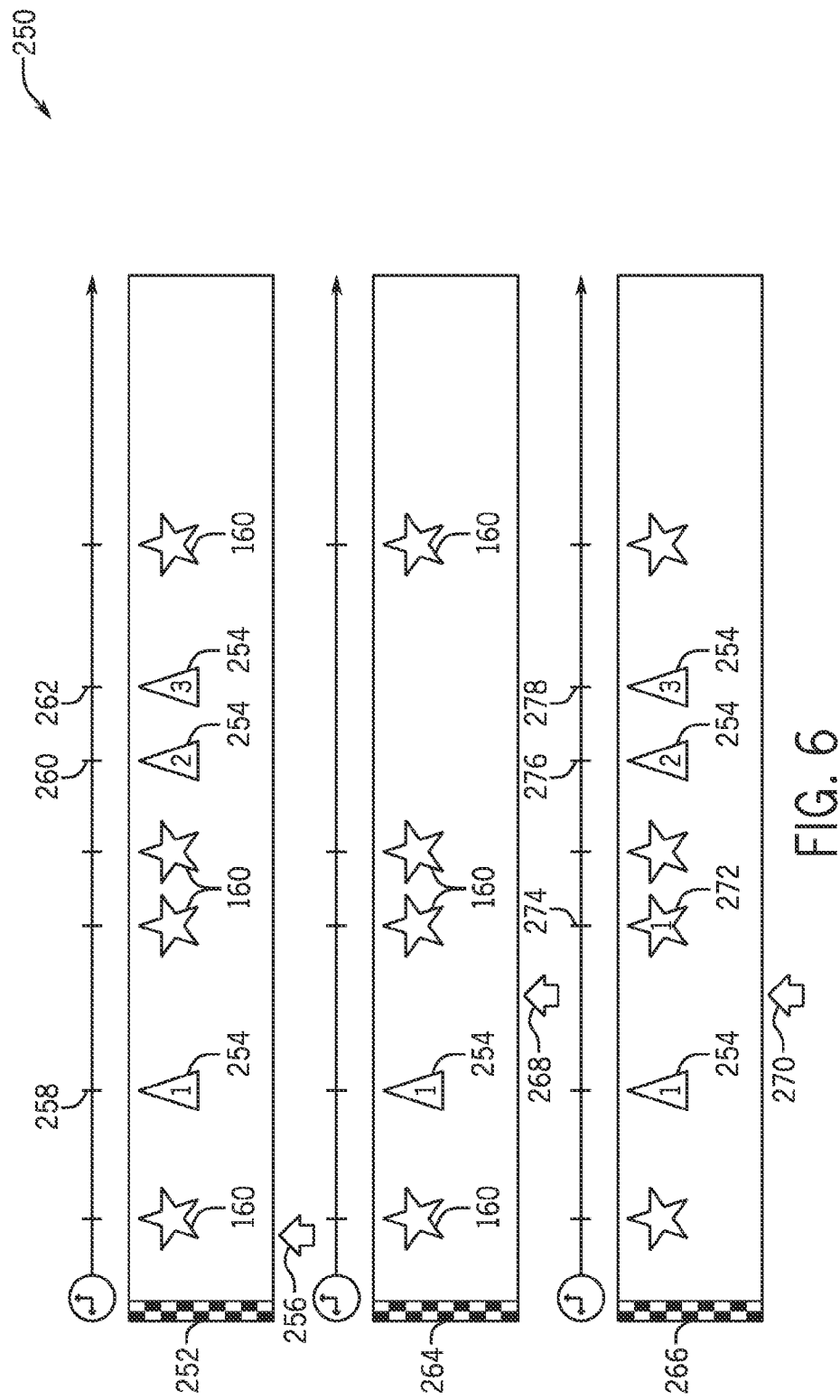
FIG. 6 is a diagrammatical representation of a variant of relational and dynamically adjusting supplemental content triggers, also illustrating triggers that are interchangeably associated with primary long-form content and/or primary pod content, in accordance with an embodiment.

As mentioned above, the supplemental content triggers may be associated with various provision rules. The exemplary trigger timelines provided in FIGS. 5 and 6 are provided to illustrate sequential triggering and dynamic adjustment of triggers. These examples are not meant to limit the embodiments, but instead are provided as examples of particular rules that may be implemented in the supplemental content timing scripts (e.g. the long-form timing script and/or the linearized content timing script). Indeed, many variants are envisioned to the scripting rules. For example, there may be scripting rules that create new triggers and/or edit supplemental content events in a timeline based upon when a content consumer began consuming the primary content, the duration of time a content consumer has been consuming primary content, the historical consumption history of the content consumer, etc.

FIG. 5 is a diagrammatical representation 200 of a variant of relational and dynamically adjusting supplemental content triggers, in accordance with an embodiment. For example, in the exemplary content timeline 202, the triggers 204 may be sequential triggers where the second trigger only activates a supplemental content event (e.g., start/stop provision of supplemental content) if the first trigger activates a supplemental content event. Arrow 205 illustrates that the content consumer begins watching the content 202 at a time prior to the timing of the first sequential trigger 204. Accordingly, the first sequential trigger 204 will trigger the first sequential supplemental content event 206. Thus, the second sequential trigger 204 will trigger the second sequential event 208.

In some embodiments, as depicted in exemplary content timeline 210, if the first sequential event 206 did not occur (e.g., because the trigger occurred prior to the content consumer's playback of the content as indicated by the arrow 212) the first sequential event is associated with a subsequent trigger 160 (e.g., either new or already existing) and a new first sequential event 206' is triggered. Accordingly, the second sequential event 208 may be triggered by the sequential triggers 204.

In some embodiments, if the first sequential event 206 did not occur (e.g., because the trigger occurred prior to the content consumer's playback of the content) the second sequential event 206 is not triggered, even if the second trigger occurs after the content consumer's playback. For example, FIG. 6 is a diagrammatical representation 250 of a variant of relational and dynamically adjusting supplemental content triggers, also illustrating triggers that are interchangeably associated with primary long-form content and/or primary pod content, in accordance with certain embodiments. In the exemplary content timeline 252, three sequential pod triggers 254 occur after the content consumer begins playback (arrow 256). Accordingly, sequential events 258, 260, and 262 are triggered.

In the embodiment illustrated in exemplary content timeline 264, the content consumer playback begins (arrow 268) after the first sequential pod trigger 254. In the exemplary embodiment, there may be a rule that allows supplemental content associated with pod content to only be played in pods at pre-existing pod trigger locations. Accordingly, because there are not enough pod triggers in timeline 264 to incorporate all three sequential triggers at pod trigger locations, the subsequent sequential pod triggers 254 are removed.

In an alternative embodiment, illustrated in timeline 266, pod content may be provided at any pre-existing pod trigger locations, either in the pod or the primary content. Accordingly, while the content consumer playback begins (arrow 270) at a time after the first sequential pod trigger 254, the first sequential trigger is moved to one of the triggers 272 in a primary content segment. Accordingly, once the trigger 272 is reached, the first sequential event 274 is triggered. The additional sequential events 276 and 278 may be triggered by the second and third sequential pod triggers 254.

Figure 7:
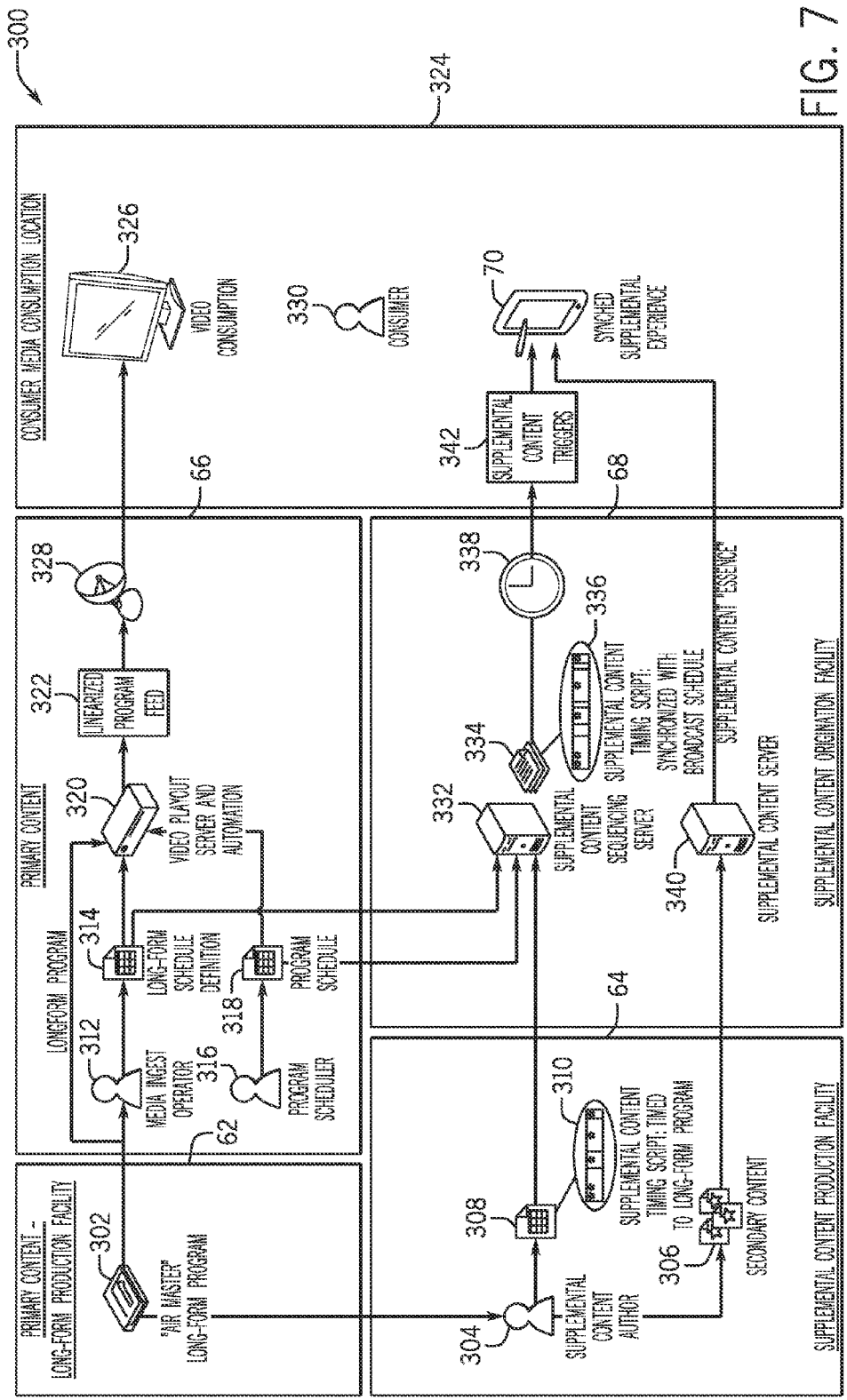
FIG. 7 is a diagrammatical representation of a system for performing the described techniques during live play out of the primary content, in accordance with an embodiment.

In an effort to summarize the techniques described herein, FIGS. 7 and 8 illustrate systems for synchronizing supplemental content to long-form content, which gets converted to synchronization with a linearized program feed. FIG. 7 is a diagrammatical representation of a system for performing the described techniques during live play out of the primary content, in accordance with an embodiment. As mentioned above, the primary content production facility 62 creates a long-form program 302. The long-form program 302 is provided to the supplemental content production facility 64, where supplemental content author 304 authors supplemental content 306 associated with the long-form program 302. Further, the author 304 creates a long-form timing script 308, defining a timeline 310 of supplemental content event triggers with reference to timings of the long-form program 302.

Turning now to a discussion of the primary content origination facility 66, a media ingest operator 312 defines a long-form schedule definition 314 defining the start/stop points for the segments of the long-form program. For example, in some embodiments, this is determined based upon denoting when black slugs are found in the long-form program 302. Further, a program scheduler 316 creates a broadcast/program schedule 318 by scheduling the long-form program 302 to run at a particular time and date and inserting pods/pod content in between the segments of the long-form program 302 (e.g., at the black slug locations). The video playout and automation server 320 receives the long-form program 302, the pod content, the long-form schedule definition 314, and the program schedule 318. Based upon these components, the video playout and automation server 320 provides commands to play the long-form program 302 segments and pod content at the proper times according to the program schedule 318. Accordingly, a linearized program feed 322 is delivered to the consumer media consumption location 324 (e.g., to a video consumption device 326 via multi-channel video program distribution (MVPD) and/or an over-the air broadcast 328). Thus, the content consumer 330 is able to watch the linearized program feed 322 containing the primary content.

Turning now to a discussion of the supplemental content origination facility 68, a supplemental content sequencing server 332 may receive the long-form schedule definition 314, the long-form timing script 308 and the program schedule 318. Based upon these three components, the supplemental content sequencing server 332 may create a linearized content script 334 defining a timeline 336 of supplemental content event triggers timed to the real-world playback time 338 of the linearized program feed 322 (e.g., the long-form program +populated pod content broadcasted at a particular time). Additionally, the supplemental content 306 is provided to a supplemental content consumption device 70 (e.g., via the sequencing server 332 or an additional supplemental content server 340).

Based upon the linearized content script 336, supplemental content event triggers 342 are either sent to or generated on the supplemental content consumption device 70. Based upon these triggers 342, supplemental content 306 is provided and/or removed from the consumer 330's consumption at the supplemental content consumption device 70.

The long-form based synchronization of supplemental content may be beneficial in time-shifted playback of primary content as well. For example, a content consumer may prerecord (e.g., via a digital video recorder) a linearized playback feed prior to actual consumption. FIG. 8 is a diagrammatical representation of a system 400 for performing the described synchronization techniques during time-shifted play out of the primary content, in accordance with an embodiment. As may be appreciated, the actors and functions are similar to those of system depicted in FIG. 7. For example, the primary content production facility 62 produces the long-form program 302, the supplemental content production facility 64 authors and provides supplemental content 306 and the long-form timing script 308, and the supplemental content origination facility 68 creates and provides the supplemental content 306 and a linearized content script 334 to the consumer media consumption location 402.

However, in this embodiment, the content consumer 330 is consuming the primary content at a start time not indicated by the program schedule 318. For example, the consumer 330 may be watching previously recorded content from a digital video recorder (DVR) or may be watching content that is configured as video on demand (VOD) via equipment 404. Accordingly, the technique at the supplemental content consumption device 70 is slightly altered. First, the device 70 determines a reference point for a current playback time of the time-shifted content. For example, as illustrated by clock 406, this reference point may be determined via timestamps provided with the time-shifted content or via a time point discerned from other synchronization technologies such as automatic-content recognition, working from the original airtime, etc. Next, circuitry of the device 70 adjusts the linearized content script 334 based on the actual playback reference point and generates triggers according to the time-shifted playback, as indicated by the clock 408. As the playback of the time-shifted content proceeds, the generated triggers 410 launch supplemental content events at the device 70.

In some embodiments, the time-shift may result in addition, removal, or substitution of supplemental content. For example, if the supplemental content is advertisements that, after a time-shift, are no longer applicable, newer, more applicable advertisements may be substituted for the non-applicable advertisements. In some embodiments, this may be done via rules in the scripts 308 and/or 334. Alternatively, the supplemental content production facility 64 and/or the supplemental content origination facility 68 may prepare and provide updated scripts 308 and 334 and/or updated supplemental content 306 to the supplemental content consumption device 70 as the supplemental content 306 should be refreshed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for synchronizing primary digital content and supplemental digital content, comprising:
    timing the supplemental digital content to a long-form version of the primary digital content, wherein the long-form version comprises a version of the primary content comprising segment definitions where additional content may be inserted for a broadcast of the primary digital content and, optionally, content placeholder pods;
    creating a long-form timing script interpretable by a machine to create supplemental content triggers timed to the long-form version of the primary digital content;
    scheduling provision of a linearized program feed comprising the long-form version and the additional content, inserted at the segment definitions;
    creating a broadcast schedule for the linearized program feed; and
    creating a linearized content script based upon the broadcast schedule and the long-form timing script, wherein the linearized content script times the supplemental content triggers of the long-form timing script to the scheduled linearized program feed.

2. The method of claim 1, comprising:
    receiving the long-form version; and
    authoring the supplemental digital content based upon the long-form version of the primary digital content.

3. The method of claim 1, comprising:
    receiving the supplemental content at a supplemental content consumption device; and
    presenting, at the supplemental content consumption device, the supplemental content at timeframes of playback of the linearized program feed based on the linearized content script.

4. The method of claim 1, comprising authoring the long-form version at a primary content production facility.

5. The method of claim 1, comprising creating the linearized content script based upon a long-form schedule definition that defines start and stop points of segments of the long-form program.

6. The method of claim 1, wherein the supplemental digital content comprises, audio, video, text, images, computer-implemented instructions, or any combination thereof.

7. A system for synchronizing digital content, comprising:
    a primary content playback circuitry configured to present a linearized program feed of primary digital content;

a supplemental content playback circuitry configured to present supplemental content associated with the linearized program feed of primary digital content;

a linearized content script that times particular trigger points for supplemental content events to a scheduled broadcast of the linearized program feed of primary digital content, wherein the linearized content script is generated based upon a long-form timing script that times the particular trigger points to a long-form version of the primary digital content, wherein the long-form version of the primary digital content comprises segment definitions where additional content may be inserted for a broadcast of the primary digital content and, optionally, content placeholder pods; and a sequencing component, comprising circuitry configured to trigger presentation of the supplemental content based upon the linearized content script, wherein the linearized program feed comprises the long-form version of the primary digital content and the additional content, inserted at the segment definitions.

8. The system of claim 7, comprising processing circuitry configured to:
monitor primary content playback characteristics of the primary content playback circuitry; and
modify presentation of the supplemental content based upon the primary content playback characteristics.

9. The system of claim 7, comprising interface circuitry configured to:
receive the supplemental content from a supplemental content provider; and
receive the linearized content script from a supplemental content sequencing provider.

10. The system of claim 9, wherein the supplemental content provider and the supplemental sequencing provider are one and the same.

11. The system of claim 7, wherein the primary content playback circuitry is configured to receive the primary digital content as a linearized program feed from cable communications, Internet communications, broadcast communications, satellite communications, cellular communications, wireless communications, or any combination thereof.

12. The system of claim 7, comprising:
a television comprising the primary content playback circuitry, the supplemental content playback circuitry, and the sequencing component.

13. The system of claim 7, comprising:
a time-shift device configured to cause playback of the linearized program feed of the primary content at an unscheduled time; wherein the sequencing component is configured to trigger presentation of the supplemental content based upon the linearized content script and a reference time point related to the unscheduled time.

14. A tangible, non-transitory, machine-readable medium, comprising:
a linearized content script configured to:
specify timings for one or more particular supplemental content event triggers with reference to a scheduled linearized program feed broadcast of primary digital content,
wherein the linearized content script is generated based upon a long-form timing script configured to:
specify timings for the one or more particular supplemental content event triggers with reference to a long-form version of the primary digital content, wherein the long-form version comprises a version of the primary content comprising segment definitions where additional content may be inserted for a broadcast of the primary digital content;
wherein the linearized program feed broadcast comprises the long-form version and the additional content, inserted at the segment definitions.

15. The machine-readable medium of claim 14, wherein the one or more particular supplemental content event triggers comprise sequential event triggers configured to require a first trigger to activate a first supplemental content event prior to a second trigger activating a second supplemental content event.

16. The machine-readable medium of claim 14, wherein the linearized content script comprises:
one or more rules configured to dynamically add, remove, or alter one or more of the particular supplemental content event triggers.

17. The machine-readable medium of claim 16, wherein the one or more rules are configured to add, remove, or alter the one or more of the particular supplemental content event triggers based upon whether previous supplemental content event triggers executed a supplemental content event.

18. The machine-readable medium of claim 16, wherein the one or more rules are configured to add, remove, or alter the one or more of the particular supplemental content event triggers based upon one or more characteristics of the playback of the primary content.

19. The machine-readable medium of claim 16, wherein the one or more rules are configured to dynamically move a supplemental content trigger associated with a segment of the long-form version to a supplemental content trigger associated with pod content of the scheduled broadcast upon the occurrence of a playback event.

20. The machine-readable medium of claim 14, wherein the linearized content script is configured to trigger supplemental content during playback of pod content.

21. The machine-readable medium of claim 14, wherein the linearized content script comprises applicability dates for the supplemental content, configured to define a time period where the supplemental content is applicable, such that supplemental content that is not applicable during a playback time is not presented at a supplemental content consumption device.

22. The machine-readable medium of claim 14, wherein the linearized content script is configured to trigger supplemental content branching events, wherein the supplemental content branching events are configured to present alternative supplemental content based upon interaction with previously presented primary content, supplemental content, or both.

* * * * *